(12) United States Patent
Schenk et al.

(10) Patent No.: US 8,529,399 B2
(45) Date of Patent: Sep. 10, 2013

(54) METHOD FOR CONTROLLING A HYBRID DRIVE

(75) Inventors: Rene Schenk, Tamm (DE); Oliver Kaefer, Murr (DE); Thorsten Juenemann, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 572 days.

(21) Appl. No.: 12/308,477

(22) PCT Filed: Aug. 24, 2007

(86) PCT No.: PCT/EP2007/058817
§ 371 (c)(1),
(2), (4) Date: Aug. 13, 2010

(87) PCT Pub. No.: WO2008/049662
PCT Pub. Date: May 2, 2008

(65) Prior Publication Data
US 2010/0304923 A1    Dec. 2, 2010

(30) Foreign Application Priority Data
Oct. 23, 2006  (DE) .................. 10 2006 049 888

(51) Int. Cl.
*B60K 1/02* (2006.01)
(52) U.S. Cl.
USPC ............................................................. 477/3
(58) Field of Classification Search
USPC ............................................................. 477/3
See application file for complete search history.

(56) References Cited

U.S. PATENT DOCUMENTS

| | | | | |
|---|---|---|---|---|
| 3,791,473 | A * | 2/1974 | Rosen | 180/65.26 |
| 4,533,011 | A * | 8/1985 | Heidemeyer et al. | 180/65.25 |
| 5,176,213 | A * | 1/1993 | Kawai et al. | 180/243 |
| 5,697,466 | A | 12/1997 | Moroto et al. | |
| 5,720,690 | A * | 2/1998 | Hara et al. | 477/20 |
| 5,841,201 | A * | 11/1998 | Tabata et al. | 290/40 C |
| 5,842,534 | A * | 12/1998 | Frank | 180/65.25 |
| 5,934,396 | A * | 8/1999 | Kurita | 180/65.25 |
| 5,939,794 | A * | 8/1999 | Sakai et al. | 290/40 A |
| 6,018,198 | A * | 1/2000 | Tsuzuki et al. | 290/17 |
| 6,315,068 | B1 * | 11/2001 | Hoshiya et al. | 180/65.25 |
| 6,350,217 | B1 | 2/2002 | Unterforsthuber | |
| 6,421,596 | B2 * | 7/2002 | Lee | 701/51 |
| 6,488,608 | B2 * | 12/2002 | Yamaguchi et al. | 477/3 |
| 6,808,470 | B2 * | 10/2004 | Boll | 477/6 |

(Continued)

FOREIGN PATENT DOCUMENTS

| CN | 1659054 | 8/2005 |
|---|---|---|
| DE | 10161900 | 8/2002 |

(Continued)

OTHER PUBLICATIONS

International Search Report, PCT International Patent Application No. PCT/EP2007/058817, dated Jan. 22, 2008.

*Primary Examiner* — Dirk Wright
(74) *Attorney, Agent, or Firm* — Kenyon & Kenyon LLP

(57) ABSTRACT

A method for controlling a hybrid drive of a vehicle, which includes at least one internal combustion engine and at least one electric machine, having a first clutch situated between the electric machine and the drive train of the vehicle and a second clutch situated between the electric machine and the internal combustion engine. Performance parameters of the hybrid drive are controlled as a function of the driver's intent.

5 Claims, 2 Drawing Sheets

(56) References Cited

U.S. PATENT DOCUMENTS

| | | | |
|---|---|---|---|
| 6,966,868 B2* | 11/2005 | Stork et al. ................... 477/74 |
| 6,997,275 B2* | 2/2006 | Mesiti et al. ............... 180/65.25 |
| 7,017,692 B2* | 3/2006 | Grassl et al. .............. 180/65.25 |
| 7,131,510 B2* | 11/2006 | Mesiti et al. ............... 180/65.25 |
| 7,143,851 B2* | 12/2006 | Masterson ................. 180/65.25 |
| 7,160,225 B2* | 1/2007 | Berger et al. ..................... 477/5 |
| 7,188,546 B2* | 3/2007 | Olofsson ........................ 74/513 |
| 7,347,803 B2* | 3/2008 | Kobayashi et al. ............... 477/5 |
| 7,351,182 B2* | 4/2008 | Kobayashi ....................... 477/5 |
| 7,360,616 B2* | 4/2008 | Schiele ................... 180/65.265 |
| 7,377,344 B2* | 5/2008 | Barske ...................... 180/65.28 |
| 7,463,962 B2* | 12/2008 | Brunemann et al. ........... 701/55 |
| 7,472,769 B2* | 1/2009 | Yamanaka et al. ........ 180/65.25 |
| 7,644,790 B2* | 1/2010 | Roske et al. .............. 180/65.22 |
| 7,645,209 B2* | 1/2010 | Dreibholz et al. ................ 477/5 |
| 7,654,932 B2* | 2/2010 | Gohring et al. ................... 477/5 |
| 7,678,005 B2* | 3/2010 | Tuckfield ..................... 475/131 |
| 7,693,637 B2* | 4/2010 | Mensler et al. ................ 701/55 |
| 7,753,150 B2* | 7/2010 | Tamor ..................... 180/65.265 |
| 7,762,922 B2* | 7/2010 | Dreibholz et al. ................ 477/5 |
| 7,766,107 B2* | 8/2010 | Joe et al. .................. 180/65.21 |
| 7,770,678 B2* | 8/2010 | Nozaki et al. ................ 180/65.6 |
| 7,784,575 B2* | 8/2010 | Yamanaka et al. ....... 180/65.275 |
| 7,869,926 B2* | 1/2011 | Tuckfield et al. ................ 701/56 |
| 7,878,281 B2* | 2/2011 | Tanishima ............... 180/65.265 |
| 7,885,737 B2* | 2/2011 | Hirata et al. .................... 701/22 |
| 7,954,581 B2* | 6/2011 | Tanishima ............... 180/65.275 |
| 7,967,397 B2* | 6/2011 | Zillmer et al. ................. 303/151 |
| 7,975,791 B2* | 7/2011 | Nozaki et al. ................ 180/65.6 |
| 8,002,059 B2* | 8/2011 | Tanishima ............... 180/65.275 |
| 8,007,401 B2* | 8/2011 | Saito et al. ........................ 477/3 |
| 8,132,635 B2* | 3/2012 | Fujimoto et al. ......... 180/65.285 |
| 2003/0065433 A1 | 4/2003 | Homeyer |
| 2006/0006008 A1* | 1/2006 | Brunemann et al. ......... 180/65.2 |

FOREIGN PATENT DOCUMENTS

| | | |
|---|---|---|
| DE | 10316422 | 12/2003 |
| EP | 1052135 | 11/2000 |
| EP | 1785305 | 5/2007 |
| JP | 2000-120858 | 4/2000 |
| JP | 2000-145946 | 5/2000 |
| JP | 2000-179678 | 6/2000 |
| JP | 2003-200758 | 7/2003 |

* cited by examiner

METHOD FOR CONTROLLING A HYBRID DRIVE

FIELD OF THE INVENTION

The present invention relates to a method for controlling a hybrid drive of a vehicle.

BACKGROUND INFORMATION

A hybrid drive generally includes at least one internal combustion engine, at least one electric machine, and at least one clutch between the internal combustion engine and the electric machine, as well as between the electric machine and the downstream drive train of the vehicle. As the existing drive concepts in the automobile industry regarding consumption optimization, emission reduction, and improvement of the subjective driving experience are being refined, hybrid drives are becoming more and more important. They have, in addition to the internal combustion engine, at least one additional drive source which is not operated using fossil fuels. Using an appropriate operating strategy, the advantages of the different drive sources may be made optimum use of, while compensating for their disadvantages. The combination of an internal combustion engine with electric machines as alternative drive sources is a dominant variant within the automobile industry. A series of different hybrid vehicles have already been designed for mass production or almost-mass production. The common feature of all is that, compared to vehicles driven conventionally by internal combustion engines, they consume less fuel. The consumption savings is due to the hybrid-specific options of energy recovery during braking and to the implementation of start-stop functions. In hybrid drives a distinction is made between parallel, series, and split hybrids. The common feature of all is the use of two energy accumulators, a battery and a fuel tank. Capacitors may also be considered as energy accumulators as an alternative to batteries. Another distinctive feature of hybrid drives is the performance of the electric machines. A distinction is made between mild and full hybrid variants, a so-called full hybrid being understood as a vehicle which is capable of being driven by the electric drive alone. So-called power-branching hybrid drives will not be discussed for purposes of the present invention because these drives are started differently and therefore the underlying problem of the present invention does not exist. So-called starter-generators are also conventional. However, since in such devices the electric machine is fixedly connected to the crankshaft of the vehicle, the problem of synchronization during operation does not exist.

SUMMARY

An object of the present invention is to improve the start operation in a vehicle having a hybrid drive designed as a parallel hybrid.

The present invention makes it possible to improve the start operation in a vehicle which is equipped with a hybrid drive designed as a parallel hybrid. An additional clutch designed as a proportional clutch is provided here between the internal combustion engine and an electric machine. A configuration of this type allows the vehicle to be driven using the electric machine in the disengaged state of this additional clutch. The problem here is that in the event of increased power requirement or decreasing charge state of the battery, the internal combustion engine must be started without causing interference in the drive train. The start of the internal combustion engine is achieved by engaging this additional clutch. This clutch should, however, be controlled in such a way that, on the one hand, the torque is sufficient for bringing the internal combustion engine to a rotational speed required for a successful start. On the other hand, the torque used for accelerating the internal combustion engine should be the lowest possible, since it must be additionally applied by the electric machine and kept in reserve. The present invention allows the hybrid drive to be controlled more conveniently by taking into account the driver's intent in starting the internal combustion engine.

BRIEF DESCRIPTION OF THE DRAWINGS

Specific embodiments of the present invention are explained in greater detail below with reference to the figures.

DETAILED DESCRIPTION OF EXAMPLE EMBODIMENTS

Figure 1:
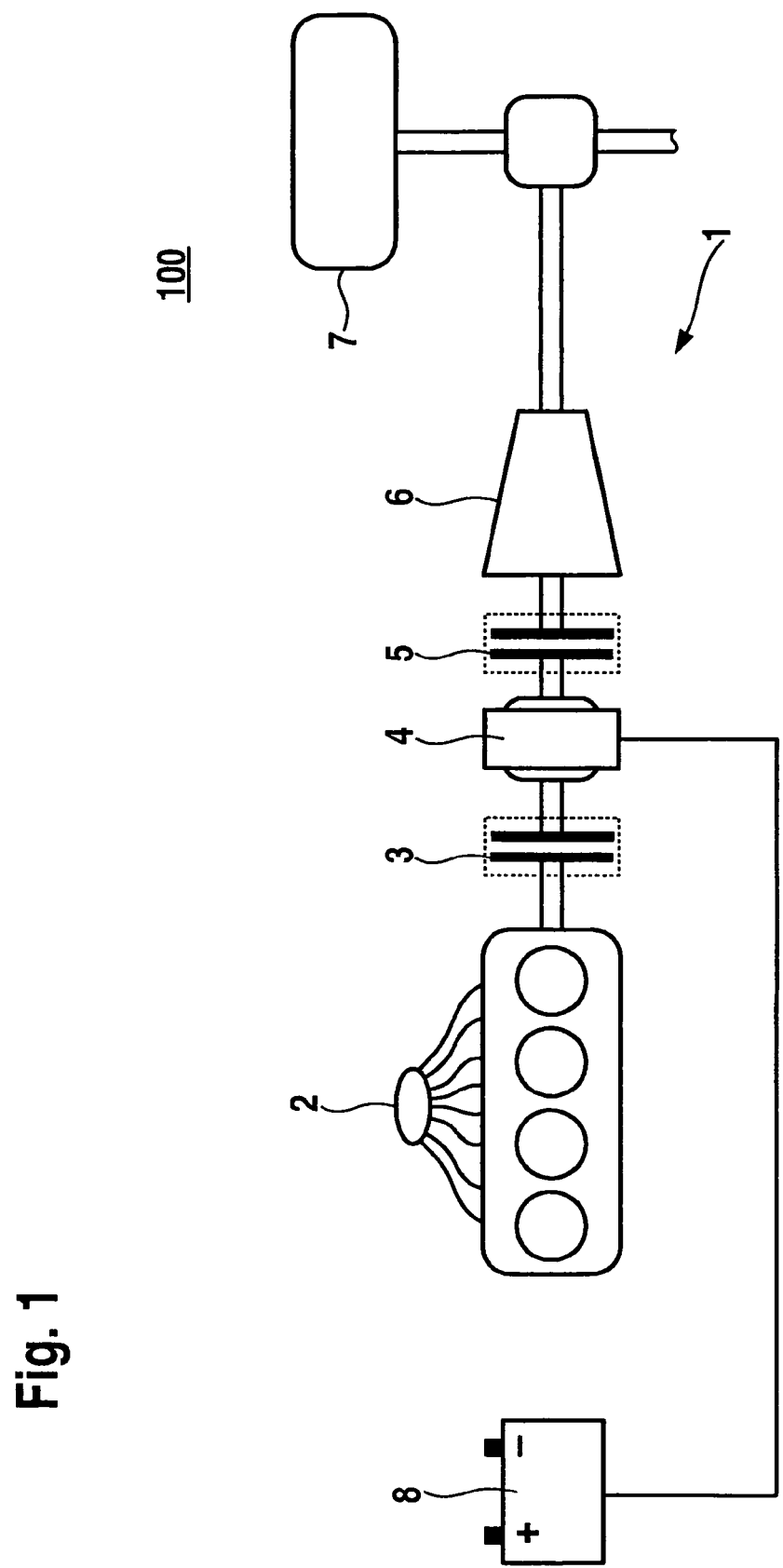
FIG. 1 schematically shows a vehicle having a hybrid drive.

Specific embodiments of the present invention are explained in greater detail below with reference to the figures. FIG. 1 schematically shows a vehicle 100 having a hybrid drive 1. Hybrid drive 1 includes a conventional internal combustion engine 2 and an electric machine 4. A first clutch 5 is situated between electric machine 4 and the schematically represented drive train identified by reference numeral 6. A second clutch 3 is situated between internal combustion engine 2 and electric machine 4. This is preferably a proportional clutch. The chassis of vehicle 100 is indicated by a wheel 7 and a portion of an axle including a differential. A battery supplying electric machine 4 with power is identified by reference numeral 8. Further components of the vehicle electrical system are not illustrated in FIG. 1. Hybrid drive 1 illustrated in FIG. 1 allows vehicle 100 to be driven electrically only by electric machine 4. In this case, second clutch 3 situated between internal combustion engine 2 and electric machine 4 is disengaged. However, when the charge state of battery 8 drops to an excessively low level or more power is required, internal combustion engine 2 is started. This is made possible by engaging second clutch 3. However, this should not cause interference in drive train 6 of vehicle 100 if possible. For this purpose, a slip torque is initially applied to clutch 5. Interferences that could occur on the part of electric machine 4 due to the start of internal combustion engine 2 may thus be separated from drive train 6 of vehicle 100. Furthermore, clutch 3 is controlled to a defined slip torque. This slip torque causes internal combustion engine 2 to accelerate until it has reached the same rotational speed as that of electric machine 4. Clutch 3 is then fully engaged and internal combustion engine 2 may transmit a torque to drive train 6 of vehicle 1. The additional torque during the slip phase, referred to hereinafter also as slip torque, must be provided by electric machine 4. Clutch 3 must be controlled in such a way that, on the one hand, the torque transmitted to internal combustion engine 2 is sufficient to bring internal combustion engine 2 to a rotational speed required for a successful start. On the other hand, the torque needed for accelerating internal combustion engine 2 must be as low as possible, since it must be additionally applied by electric machine 4 and therefore kept in reserve. At the end, clutch 5 is also engaged again. However, engaging this clutch depends on the particular operating point. Thus, for example, at a low rotational speed, clutch 5 may not be fully engaged.

In the above-described sequence, there are several opportunities for improving the start comfort. However, most of them have the disadvantage that their use lengthens the start time. The present invention may ensure that a start of the internal combustion engine is adapted to the driver's intent and/or the driving situation, so that an optimum compromise is achieved.

In accordance with the present invention, a classification and prioritization of the driver's intent and/or the driving situation is provided. In the specific embodiment described in the following, a classification into three classes is provided as an example.

Class 1 covers a start without any special torque request, which is triggered by the electrical system of vehicle 100, for example. This case occurs, for example, when the charge state of the battery drops to an excessively low level. In this start situation the instantaneous torque request is generally defined by the electric machine.

Class 2 relates to a start operation associated with a moderate torque request, when a considerably higher torque is requested than what electric machine 4 is able to deliver.

Class 3 relates to a start operation associated with a very high torque request.

The sequence of the start operation is established using different degrees of optimization for the above-mentioned classes. For a start without a special torque request according to class 1, there is usually no rush. All parameters may therefore be implemented for maximum comfort.

In the case of a start operation with a very high torque request according to class 3, usually the shortest possible response time is to be implemented. If a slight jolt occurs in the drive train of vehicle 100 due to the start operation, it is not particularly critical, since a relatively strong jolt is caused in drive train 6 of the vehicle anyway by the high torque request.

For the start operation with a moderate torque request according to class 2, a medium application may be selected. This means that a not too slow sequence may be combined with satisfactory comfort.

Figure 2:
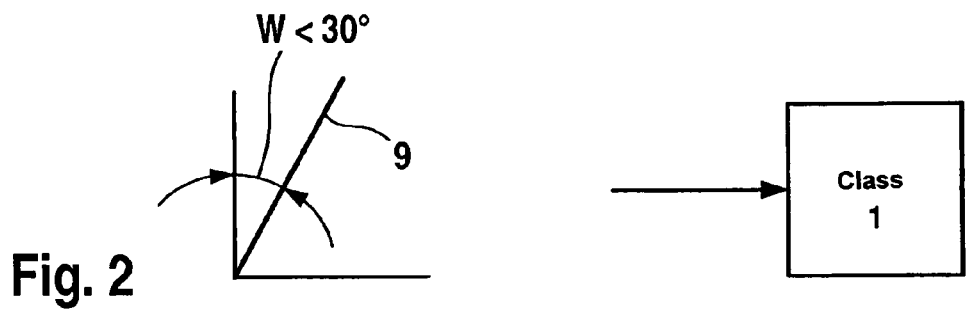
FIG. 2 shows the assignment of the accelerator pedal path to a driver's intent class.
Figure 3:
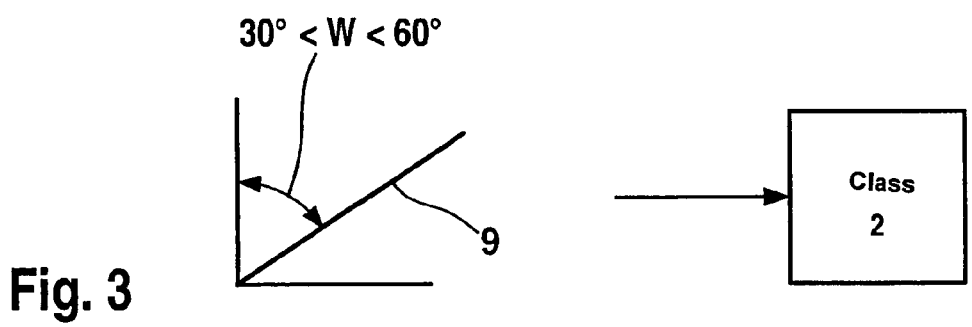
FIG. 3 shows the assignment of the accelerator pedal path to a driver's intent class.
Figure 4:
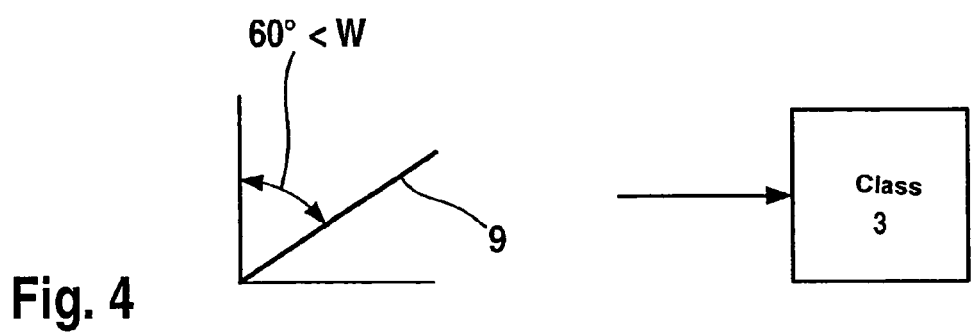
FIG. 4 shows the assignment of the accelerator pedal path to a driver's intent class.

To carry out the desired start type and the appropriate class assignment according to the above-mentioned classification, the position of the accelerator pedal may be used according to a first embodiment variant of the present invention. A threshold value is then assigned to an angular position of accelerator pedal 9 or to a percentage of the maximum path of accelerator pedal 9. A start operation according to class 1 is then initiated, for example, when the position of accelerator pedal 9 corresponds to a value W<30% of the possible pedal path (FIG. 2). A start operation according to class 2 is initiated, for example, when the position of accelerator pedal 9 corresponds to a value W between 30% and 60% of the possible pedal path (FIG. 3). A start operation according to class 3 above is initiated, for example, when the position of accelerator pedal 9 corresponds to a value W greater than 60% of the maximum pedal path (FIG. 4).

According to an alternative embodiment variant of the present invention, the above-mentioned class assignment may be carried out taking into account the speed of operation of accelerator pedal 9. A high rate of change of the accelerator pedal movement allows a high future torque request to be inferred, so that a start operation according to class 3 is initiated.

Similarly, a slower rate of change results in a start operation according to class 2 because a lower torque request is assumed. Furthermore, a combination of accelerator pedal position and rate of change of the accelerator pedal position is also possible.

According to another embodiment variant of the present invention, the type of driver may also be recognized and the recognized driver type (sporty, relaxed) used for the above-mentioned classification. A driver assistance system may derive the type of driver, for example, from the way he operates the accelerator pedal, the brake pedal, and the steering. If the above-mentioned operating elements are often operated highly dynamically, a particularly sporty driver is assumed.

Furthermore, threshold values may be made to depend on the selected shifting program of an automatic transmission (for example, sporty or relaxed).

In general, when a plurality of selection criteria is used, the recognition of a start class characterized by a higher torque request is prioritized in comparison with a start class characterized by a lower torque request.

In the following, the effects on the control of the hybrid drive depending on the selected class are described. A drive train having a torque converter is discussed first. In this case, the rate of disengagement of the converter bypass clutch is advantageously made to depend on the selected classification and the start type provided therewith. A lower rate of disengagement is provided for class 1. This has the disadvantage that the sequence takes longer, but the advantage that almost no interference affects drive train 6 of vehicle 100. In contrast, in the case of class 3, the rate of disengagement of the converter bypass clutch is high; however, interference in drive train 6 must be accepted.

As long as clutch 3 is designed as a proportional clutch as in the present exemplary embodiment, the slip torque using which internal combustion engine 2 of hybrid drive 1 is accelerated during start may be advantageously made to depend on the selected class. The slip torque is thus selected just of the desired magnitude for class 1. In contrast, for class 3 a maximum slip torque is provided to achieve minimum start time of internal combustion engine 2.

Either the rate of engagement or the time of engagement may be selected as a function of the class for engaging the converter bypass clutch after the start. This is not necessarily the same class as during the disengagement operation, since the driver's intent may have changed in the meantime. In the interest of high flexibility, a class change may always take place due to a change in the driver's intent.

During start, electric machine 4 is operated in a speed-regulated mode. As soon as internal combustion engine 2 has been accelerated to the rotational speed of electric machine 4 and is already delivering a torque by itself, a speed overshoot may easily occur since occasionally internal combustion engine 2 initially generates an excessively high torque. It is therefore advantageous to let the speed regulation run on for some time after the start to dampen the overshoot. This overshoot time of the speed regulation may also be advantageously made dependent on the class assignment. In the case of class 1, a relatively long overshoot time may be selected with good dampening of the overshoot. In the case of class 3, a short overshoot time combined with rapid response may be selected.

Normally, the throttle valve is closed when internal combustion engine 2 starts, in order to avoid speed overshoot due to a high torque. However, when there is a request for a high torque as in the case of class 3, internal combustion engine 2 is to deliver maximum torque as rapidly as possible. In this respect, the throttle valve may also be controlled as appropriate at the beginning of the start as a function of the selected class.

What is claimed is:

1. A method for controlling a hybrid drive of a vehicle, which includes at least one internal combustion engine and at least one electric machine, having a first clutch situated between the electric machine and a drive train of the vehicle, and a second clutch situated between the electric machine and the internal combustion engine, the method comprising:
controlling performance parameters of the hybrid drive as a function of a driver's intent,
wherein the driver's intent is divided into classes, the classes differing from one another by a torque request associated with the driver's intent,
wherein the driver's intent is derived from a position of an accelerator pedal,
wherein a position of the accelerator pedal of up to 30% of a maximum position corresponds to class 1, a position of the accelerator pedal between 30% and 60% corresponds to class 2, and a position of the accelerator pedal of more than 60% of the maximum position corresponds to class 3,
wherein the second clutch is a proportional clutch, and for class 1, when the internal combustion engine is started, a slip torque is set as low as necessary, and for class 3, the slip torque is set substantially higher for achieving a shortest possible start time, such that the slip torque is set as a function of the selected class.

2. The method as recited in claim 1, wherein the hybrid drive has a torque converter and a converter bypass clutch, the converter bypass clutch being disengaged at a low disengagement rate for class 1, and at a maximum rate for class 3.

3. The method as recited in claim 1, wherein the electric machine is a speed-regulated electric machine, a relatively long time is provided for speed regulation after the start of the electric machine for class 1, and a relatively short time is provided for class 3.

4. The method as recited in claim 1, wherein a throttle valve of the vehicle is pre-controlled as a function of the class.

5. The method as recited in claim 4, wherein the throttle valve of the vehicle is pre-controlled at the starting of the internal combustion engine as a function of the selected class.

* * * * *

UNITED STATES PATENT AND TRADEMARK OFFICE
CERTIFICATE OF CORRECTION

PATENT NO. : 8,529,399 B2  Page 1 of 1
APPLICATION NO. : 12/308477
DATED : September 10, 2013
INVENTOR(S) : Schenk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1162 days.

Signed and Sealed this
Fifteenth Day of September, 2015

Michelle K. Lee
*Director of the United States Patent and Trademark Office*